Patented Nov. 3, 1925.

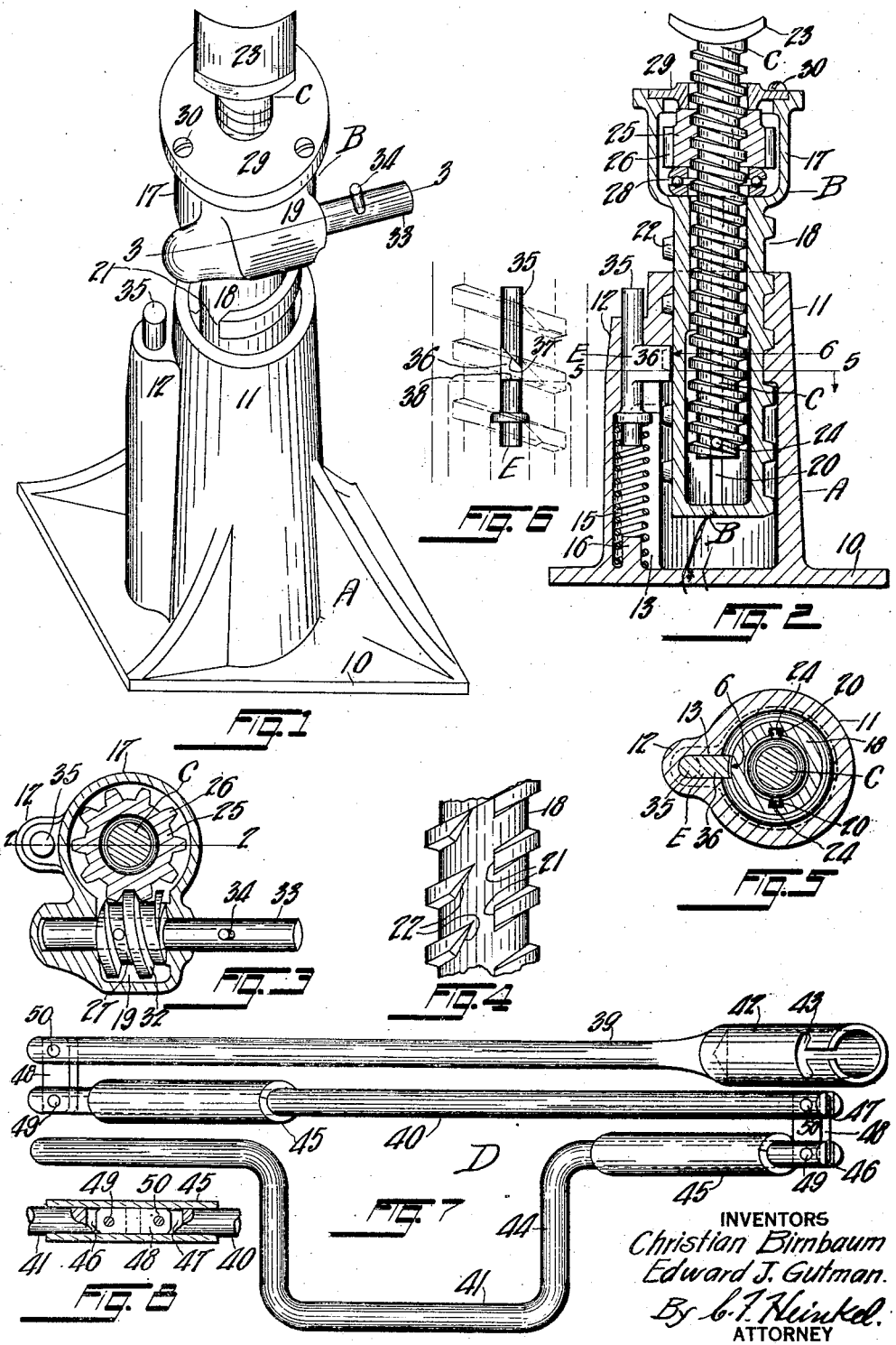

1,559,667

UNITED STATES PATENT OFFICE.

CHRISTIAN BIRNBAUM AND EDWARD J. GUTMAN, OF CLEVELAND, OHIO.

SCREW JACK.

Application filed January 30, 1923. Serial No. 615,817.

*To all whom it may concern:*

Be it known that we, CHRISTIAN BIRNBAUM and EDWARD J. GUTMAN, both citizens of the United States, and residents of Cleveland, county of Cuyahoga, and State of Ohio, have jointly invented a new and useful Screw Jack, of which the following is a specification.

Our invention relates to lifting apparatus having a screw for lifting purposes.

The main object of our invention is a simple, efficient, and inexpensive screw jack which is easy of operation, quick of adjustment, powerful in operation with comparatively light power requirements for operation, minimum height when distended, and maximum height when extended. Other objects will appear during the description of the apparatus shown in the drawing.

We attain these objects by the mechanism illustrated in the accompanying drawings in which Fig. 1 is a general perspective view of a screw jack constructed according to the present invention; Fig. 2 is a section of Fig. 1 taken on a vertical plane and indicated by 2—2 in Fig. 3; Fig. 3 is a section on a horizontal plane on line 3—3 of Fig. 1 showing the worm and wheel mechanism which operates the power screw; Fig. 4 is a side view of a portion of the adjusting screw showing how the threads are cut away; Fig. 5 is a section on a horizontal plane on line 5—5 of Fig. 2 showing the dog and its relation to the other structure; Fig. 6 is a front view of the dog as seen at 6 in Figs. 2 and 5; Fig. 7 is a perspective view of an operating handle, shown folded up; and Fig. 8 is a section view of a joint after it is opened and locked.

Similar reference characters refer to similar parts throughout the views.

The screw jack shown in the drawing consists, principally, of the base A, the adjusting screw B, and the power screw C.

The base A, made of suitable material, has the base flange 10 and the body portion 11 the upper end of which is internally threaded to fit the adjusting screw B. The boss 12 is provided on the side of the body 11 and is hollow, forming the slot 13 to accommodate the dog E and the spring 15 the bottom of which is held in position by the peg 16 provided on the base 10.

The adjusting screw B has the head 17 and the shank 18 which is externally threaded to fit to the internally threaded upper end of the body 11.

This head 17 is hollow and has the worm chamber 19 on one side thereof and opening thereinto.

This shank 18 is also hollow and the outside diameter of the power screw C fits slidably into this hollow. On each side of this hollow is a keyway 20, the purpose whereof will appear presently.

Portions of the threads on this shank 18 are cut away, on opposite sides of the shank, in such a manner that the faces 21 are formed substantially parallel with the vertical axis of the screw while the faces 22 are formed at an inclination to this axis as clearly seen in Fig. 4, the purpose whereof will appear presently.

The power screw C has the head 23 on its upper end and is threaded; the outside diameter over these threads fitting into the adjusting screw as previously stated. The pin 24 is driven through the lower end of the screw C and projects beyond the outside of each side thereof, thereby forming a key on each side of the screw which, respectively, enter to keyways 20 to prevent the rotation of the screw C in the screw B.

The worm wheel 25 is internally threaded to fit the power screw C and has the teeth 26 on the outer circumferential face thereof. In the present instance, the teeth 26 are substantially parallel with the vertical axis of the screw due to the inclined mounting of the worm 27 as will appear presently.

This worm wheel 25 is mounted in the hollow head 17; the thrust bearing 28 being interposed between the horizontal wall of this hollow and the lower face of the worm wheel, and the cover 29, bearing against the upper face of the worm wheel, being secured to the head 17 by the screws 30.

The worm 27 is located in the chamber 19 and is provided with the worm thread 32 meshing with the teeth 26 on the worm wheel 25 as is usual in worm and wheel practice. This worm 27 is secured to the shaft 33 which is journaled in the head 17, inclinedly as shown for the purpose appearing presently, and which has the pin 34 to engage the end of the operating crank D as will appear presently.

The dog E, Figs. 5 and 6, has the stem 35 and the lug 36. The upper portion of the stem 35 being slidably mounted in the upper end of the boss 12 and projects upward and outside thereof while the lower end thereof engages the inside of the upper end of the spring 15. The lug 36 projects from one side of the stem 35 and extends horizontally substantially to the bottom of the thread on the screw B. The upper face 37 of the lug 36 is inclined to substantially conform to the inclination of the faces 22 of the threads on the shank 18; the lower face 38 of the lug 36 may be square. This lug 36 substantially fills the slot 13 sidewise; the side walls of this slot 13 form abutments for the lug 36 to prevent rotation of the screw B when in normal position as will appear presently.

The operating crank D, Figs. 7 and 8, is composed of the two foldable sections 39 and 40, and the crank section 41.

The outer end of the section 39 is provided with the socket 42 which fits over the outer end of the worm shaft 33 and which is provided with the T-formed slot 43 adapted to engage the pin 34 for either right hand or left hand rotation and adapted to retain this crank on this shaft to prevent its slipping off when in operation.

The section 41 is provided with the crank 44 whereby the operating crank as a whole can be rotated.

The sections 39, 40, and 41 are permanently joined to each other by joints which permit the folding of the sections when not in use as seen in Fig. 7 and which also permit of rigid connection of these sections when extended for use as seen in Fig. 8.

These joints Fig. 8, comprise a sleeve 45 slidably mounted over the body of the section 41, the slot 46 in the end of the section 41, the slot 47 in the end of the section 40, and the link 48 in both of these slots and hingedly held therein by the pins 49 and 50 respectively.

In operation, the sections of this operating crank are extended in alignment with each other; the sleeves are then slipped over the joints as seen in Fig. 8; and the socket 42 is then slipped over the shaft 33 where it engages the pin 34 and, by manipulation of the crank 44, rotate the shaft 33 either right or left handedly.

The operation of the screw jack itself is as follows:

Assuming that the several elements of the jack are now related to each other as seen in Fig. 1 and that the jack in this relation, is placed under an object to be raised but it is found that there is a space between the bottom of this object and the head 23 on the power screw.

We first adjust the height of the jack by rotating the adjusting screw left handedly until the head 23 touches the bottom of this object and permit the spring 15 to push the lug 36 into the nearest one of the cut away portions of the thread.

When the screw B is so rotated left handedly, the inclined faces 22 on the thread meet the inclined face 37 on the lug 36 and thereby forces the lug 36, and consequently the dog E, downward against the spring 15 and permits the thread to pass the lug 36. When, however, the screw B is rotated left handedly sufficient for adjustment and such left handed rotation ceases when the lug 36 is in alignment with the cut away portion of one of the threads, the spring 15 forces the lug 36 up into this cut away portion whereupon right handed rotation of the screw B and downward movement thereof, is impossible since the face 21 bears directly against one side of the lug 36 while the other side of the lug bears against one of the walls of the slot 13.

After the lug 36 is in above position and the adjusting screw B is so locked, the operating crank is attached to the shaft 33 and rotates the same whereby the worm 31 is also rotated. Due to the mesh between the worm and the worm wheel, the now rotating worm rotates the worm wheel which, due to its threaded engagement with the screw C and being held against movement endwise, acts as a nut and forces the screw C longitudinally only since the keyways 20 engage the ends of the pin 24 and prevent the rotation of the screw C.

The direction of rotation of the shaft 33, either right or left handed, together with the lead on the worm and wheel, determines the direction of the longitudinal movement of the screw C.

When it is desired to distend or lower the adjusting screw, the stem 35 (projecting outside of the case) may be pushed down, against the spring, sufficiently far to bring the lug 36 between the threads thereby permitting the threads to pass over the lug when the screw B is rotated right handedly for downward adjustment.

It has previously been noted that the shaft 33 is inclinedly mounted in the head 17. Such inclined mounting of this shaft not only permits of the comparatively easy production of the teeth on the worm wheel, but also brings the operating end of the operating handle sufficiently far above the floor to permit of easy operation of the crank thereon without compelling the operator to stoop down too low for efficient action.

Modifications may be made within the scope of the appended claims; therefore without limiting ourselves to the precise construction and arrangements and combination of elements shown and described,

We claim:

1. An apparatus of the character described having a base, a screw threaded into said base, means engaging any of said threads to normally arrest the rotation of said screw in one direction and in any longitudinal position but permit rotation thereof in the opposite direction from any of said positions, and means to manually disengage the first said means from said threads to permit rotation of said screw in either direction.

2. An apparatus of the character described having a base, an adjusting screw threaded into said base, a power screw adapted to slide longitudinally and unrotatably in said adjusting screw, a worm and wheel mounted in the upper end of said adjusting screw and this wheel threaded to said power screw, means engaging any of said threads on said adjusting screw to normally arrest the rotation of said adjusting screw in one direction and in any longitudinal position but permit rotation thereof in the opposite direction from any of said positions, and means to manually disengage the first said means from said threads to permit rotation of said adjusting screw in either direction.

3. An apparatus of the character described having a power screw and an adjusting screw adapted to adjust said power screw to the object to be lifted and provided with threads each having a portion thereof cut away, and a dog normally disposed in one of said cut away portions to engage one of said threads to arrest the rotative movement of said adjusting screw in one direction and adapted to automatically disengage said thread upon rotation of said adjusting screw in the opposite direction to permit the free rotation thereof in the opposite direction.

4. An apparatus of the character described having an adjusting screw provided with threads each having a portion thereof cut away, each of said cut away portions bounded by one face substantially parallel with the axis of said adjusting screw and by a second face inclined to said axis, and a dog provided with a face in alignment with said parallel face and with an inclined face corresponding to said inclined face of said cut away portions and adapted to enter said cut away portion to arrest the rotative movement of said adjusting screw in one direction when said parallel face thereof contacts said parallel faces of said threads and adapted to be disengaged from said threads by said inclined faces when said adjusting screw is rotated in the opposite direction.

5. An apparatus of the character described having a base provided with a threaded opening, a screw provided with threads in said threaded opening in the base, a portion of each of said threads cut away, a dog in said base slidable parallel with said screw and adapted to normally enter said cut away portions to arrest the rotation of said screw in one direction and to be forced out of said cut away portions when said screw is rotated in the opposite direction and to be manually forced out of said cut away portions to permit rotation of said screw in either direction.

6. An apparatus of the character described comprising, a base provided with an opening threaded at the top and with a slot adjacent said opening, an adjusting screw in said opening and provided with threads, a spring in said slot, a dog in said slot and engaging one end of said spring and the upper end thereof projecting outside of said base and provided with a lug adapted to engage said threads to arrest the rotative movement of said adjusting screw in one direction and to disengage said threads to permit the rotation of said adjusting screw in the opposite direction.

7. An apparatus of the character described comprising, a base, an adjusting screw threaded into said base and having a portion of each thread cut away, a dog mounted in said base and adapted to normally enter said cut away portions to arrest the rotation of said adjusting screw in one direction and to automatically recede out of said cut away portions upon the rotation of said adjusting screw in the opposite direction and to selectively permit the rotation of said adjusting screw in either direction by manual manipulation thereof, a power screw adapted to slide unrotatably in said adjusting screw, a worm wheel mounted in said adjusting screw and threaded to said power screw, a worm mounted on said adjusting screw in mesh with said worm wheel, and a worm shaft journaled in said adjusting screw and extending outside thereof and provided with means to engage an operating handle.

CHRISTIAN BIRNBAUM.
EDWARD J. GUTMAN.